# 3,043,806
LINEAR POLYESTERS FROM DIMETHYL-MALONIC ACID

John R. Caldwell, Kingsport, Tenn., assignor to Eastman Kodak Company, Rochester, N.Y., a corporation of New Jersey
No Drawing. Filed Mar. 20, 1956, Ser. No. 572,633
5 Claims. (Cl. 260—75)

This invention relates to highly polymeric linear polyesters having high melting points and capable of being cold-drawn to form an oriented molecular structure which are made up of recurring structural units derived from various glycols and dimethylmalonic acid. The invention also relates to a process for preparing these polyesters. The polyesters can be formed into fibers, films and molding compositions which can be injection or compression molded or extruded to form any desirable shape. Interpolyesters can also be prepared having similar properties which contain recurring structural units derived from hydroxypivalic acid or various aliphatic or aromatic dicarboxylic acids.

Polyesters prepared from dibasic organic acids and glycols have been frequently described in the prior art. For example, polyethylene terephthalate is now commercially available. The use of certain branched chain aliphatic acids and particular branched chain glycols has been mentioned in several instances as suitable for the production of polyesters. However, most of the branched chain glycols cannot ordinarily be used in any substantial proportion to prepare polyesters having melting points above 200° C. Moreover, the branched chain aliphatic acids are generally not suitable for the preparation of linear polyesters having high softening temperatures.

The prior art teaches that high melting linear polyesters can frequently be prepared from particular aromatic dibasic acids such as terephthalic acid or 4,4'-diphenic acid. Although there have been descriptions of various polyesters derived from aliphatic acids, the utility of such polyesters has been quite limited because of their low melting point. This is ordinarily even more true for branched chain aliphatic dibasic acids such as 2,3-diethyl succinic acid, etc. It it therefore quite surprising that dimethylmalonic acid can be employed according to this invention to produce high melting polyesters. In fact, malonic acid is generally worthless for the production of linear polyesters since it tends to decarboxylate and enter into side reactions. Moreover, dimethylmalonic acid is also capable of decarboxylation and has a tendency under polyesterification conditions to form macrocyclic esters having 16 or more carbon atoms in the ring.

There is a pronounced need for a variety of high melting polyesters derived from dibasic acids and glycols since no single polyester composition possesses a combination of every desirable property. The linear polyesters of that invention are particularly excellent in certain regards as is expalined in detail herein.

The polyesters of dimethylmalonic acid can be prepared which have high melting points above 150° C., an intrinsic viscosity of at least 0.4 (generally considerably higher) and the ability to form fibers and films having numerous supervisor properties (such as high heat distortion temperature) without necessity for cold-drawing. In some instances it is advantageous to subject the fibers or films which can be produced from the polyesters of this invention to a cold-drawing operation so as to obtain even more advantageous properties even though the films and fibers are heat stable without drafting or heat setting. Quite surprisingly, polyesters of dimethylmalonic acid condensed with neopentylene glycol can be successfully produced, even though the tendency to form macrocyclic esters is especially pronounced. Moreover, other glycols can be employed to produce valuable polyesters as described below.

The dimethylmalonic acid interpolyesters of this invention are generally characterized by greatly improved dyeing properties as contrasted to unmodified polyesters of terephthalic acid and other aromatic dicarboxylic acids. The improvement in dyeing is obtained in interpolyesters without substantially altering the melting point, tensile strength, elongation or elastic recovery of fibers made with the aromatic dicarboxylic acids which have not been modified with dimethylmalonic acid.

It is accordingly an object of this invention to provide a new variety of highly polymeric linear polyesters based on dimethylmalonic acid which are capable of being cold-drawn to form an oriented molecular structure.

An additional object of this invention is to provide linear polyesters which are advantageously adaptable to the manufacture of films, fibers and molded objects.

Another object of this invention is to provide a new and improved method for preparing the linear polyesters with which this invention is concerned.

A still further object of this invention is to provide linear polyesters which have high melting points, excellent dyeability and other advantageous physical characteristics which facilitate their employment in the manufacture of fibers which can be formed into yarns and used in the weaving of strong, elastic, crease-resistant textile fabrics.

A further object of this invention is the provision of linear polyester films which have excellent resistance to heat distortion and other advantageous physical properties which make them especially advantageous as a supporting film base for photographic silver halide emulsions of either black and white or color varieties.

An additional object of our invention is to provide a linear polyester which has an unusually high resistance to oxidation, to degradation by ultraviolet light and to decomposition by hydrolysis.

Other objects will become apparent from the description and claims which follow.

The glycols which can be advantageously employed include ethylene glycol, polymethylene glycols containing from 2 to 10 carbon atoms, 1,4-cyclohexanedimethanol (cis or trans), and gem-dialkyl glycols having the formula:

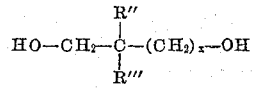

R" and R'" each represents an alkyl radical containing from 1 to 2 carbon atoms, and $x$ represents a positive integer of from 1 to 3.

It is often advantageous to conduct the condensation in the presence of a catalytic condensing agent at an elevated temperature to form an intermediate condensation product (this is called stage I), and then heating at a higher temperature up to about 275° C. at a low pressure of an inert atmosphere (this is called stage II) to form a polyester melting above 150° C. and having an intrinsic viscosity of at least 0.4.

The gem-dialkyl glycolic compounds which can be advantageously employed include 2,2-dimethyl-1,3-propanediol, 2,2-dimethyl-1,5-pentanediol, 2,2-diethyl-1,4-butanediol, etc. The first of these compounds, also called neopentylene glycol, is especially advantageous.

The lower alkanoic acid esters of any of the various glycols can also be employed, e.g. the acetic, butyric, etc. esters.

Examples of esters of dimethylmalonic acid which can be employed advantageously include dimethyl dimethylmalonate, diethyl dimethylmalonate, di-isobutyl dimethylmalonate, di-isopropyl dimethylmalonate, di-n-butyl dimethylmalonate, etc.

Examples of various catalytic condensing agents, (especially the ester interchange type catalysts) are presented in numerous patents and other prior art. These catalysts include the alkali metals, the alkaline earth metals, the oxides of these two groups of metals, the alkoxides containing from 1 to 6 carbon atoms of these two groups of metals, the carbonates and borates of these two groups of metals, lead oxide, etc. Other catalysts are described in copending applications, Ser. Nos. 313,072—313,078 filed on October 3, 1952 by Caldwell and others. The proportions of any of the catalysts which can be advantageously employed range from about 0.001 to about 1% by weight of the reactants. Higher and lower quantities can also be used. Generally from 0.005% to 0.02% is sufficient.

When esters of dimethylmalonic acid are employed it is highly advantageous to employ them in as pure form as possible. When such esters are formed from dimethylmalonic acid, the esterification procedure can be used to help facilitate the purification process. The melting point of the gem-dialkyl glycols such as 2,2-dimethyl-1,3-propanediol (neopentylene glycol) is likewise an indication of the purity of these glycols and it is quite advantageous to employ such gem-dialkyl glycols in very pure form. The use of neopentylene glycol results in a tendency toward the formation of macrocyclic diesters, hence this glycol having a melting point of about 128–129° C. is most advantageously employed. When the purity of any of these materials is of inferior quality the polyesters produced are of lower quality.

Since it is often desirable to conduct the process of this invention in the most advantageous manner to secure the production of highly polymeric products of good color and excellent physical properties, it is especially advantageous to carry out stage II of the polyesterification according to what has been called the solid-phase technique. During the last portion of stage II the high vacuum can be dispensed with and the reaction conducted with good circulation of an inert gas to carry off the glycol from the powder.

When employing the solid phase technique, good results are obtained by carrying out the second stage of the polymerization in such a way that the polymerization is stopped after a heating period of from about five to ten hours although longer or shorter periods can be employed. This intermediate "prepolymer" advantageously has an intrinsic viscosity of from about 0.15 to about 0.5 in 60% phenol and 40% tetrachlorethane or in any similar solution of phenol and a polychlorethane such as trichlorethane. Ordinarily this prepolymer is satisfactory if it has an intrinsic viscosity of from about 0.15 to about 0.3. The prepolymer is then cooled and the resulting solid product pulverized to a fine granular form having a particle size of from about 0.01 to about 0.03 inch. There is nothing critical about the grain size of the particles and any convenient particle size can be readily employed, e.g. that which passes a 20-mesh sieve. The second portion of stage II is then begun by reheating the powdered prepolymer to a temperature of from about 150° to 275° C. (preferably 200° to 250° C.) but below the sticking or softening temperature (coagulation point) of the prepolymer. This is usually performed at a pressure of about 1 mm. of mercury pressure until a polymer of the desired physical characteristics is obtained, e.g. the intrinsic viscosity is at least 0.4 (preferably about 0.6 or higher). The solid phase technique can be advantageously conducted at a temperature fairly close to the melting or softening temperature of the powder so as to minimize the length of time required for the polymerization. The solid phase technique facilitates the removal of by-products and hastens formation of the ultimate product desired. The use of the solid phase technique leads to an unexpectedly high degree of polymerization. Instead of a vacuum an inert circulating atmosphere can be employed as has been pointed out above. After melt polymerization during the first portion of stage II has been conducted for at least 10 hours in the presence of a catalyst and includes heating at a temperature of at least 200° C., the solid phase polymerization in the powder form can be subsequently conducted by beginning the solid phase heating at temperatures up to about 230° C. without exceeding the softening point of the polymer and continuing to increase the temperature taking care that the melting point or softening point is not exceeded. In the absence of any catalyst it is preferable to continue the melt polymerization during the first portion of stage II by heating for at least 30 hours before carrying out the final portion of stage II employing the solid phase technique.

An advantageous means for determining when the polymerization has been carried to a satisfactory degree is to test the intrinsic (or inherent) viscosity of the linear polyester being produced. It is generally advantageous to conduct the polymerization until the intrinsic viscosity of the product is at least equal to 0.4 as determined in a mixture of phenol (10 parts by weight) and trichlorophenol (7 parts by weight). There are of course numerous other solvents as well as various proportions which can be used for the measurement of intrinsic viscosity.

The processes described hereinabove can be adapted for continuous operation either with or without the employment of the solid phase technique.

The temperatures mentioned are not to be considered as cricitical in regard to their limits since higher or lower temperatures can be employed although they will be generally less advantageous. The reaction should be conducted under anhydrous conditions, especially during the latter part thereof and under an inert atmosphere such as nitrogen, hydrogen, argon, etc.

The polyesters of this invention can be modified by employing up to 20 percent by weight of hydroxypivalic acid based on the total weight of the dimethylmalonic acid or its ester. This modification does not significantly alter the properties of the polyester produced. Moreover, the process employed remains substantially the same as described above.

As already indicated, the polyesters of this invention are most difficult to prepare when employing a gem-dialkyl glycol; however, the polyesters which can be produced using neopentylene glycol have many unusually advantageous and unique properties. Of course, any other glycol can be employed in lieu of the gem-dialkyl glycol or this glycolic compound can be mixed with a glycolic compound having the following formula:

$$HO—CH_2—C_nH_{2n}—CH_2—OH$$

wherein $n$ represents a positive integer of from 0 to 8. Lower alkanoic acid esters of these glycols can also be employed. Examples of the glycolic compounds which can be employed include ethylene glycol, ethylene glycol diacetate, 1,5-pentanediol, 1,10-decanediol, etc. Other glycols can also be employed such as the aromatic glycols, i.e. 1,4-bis($\beta$-hydroxyethyl)-benzene, 4,4'-bis(hydroxymethyl)-diphenylsulfone, etc. Other glycols which can be used include the alicyclic glycols. A glycol of exceptional value is cyclohexane dimethanol. Any of these compounds can be referred to by the generic term "a glycolic compound having from 2 to 10 carbon atoms."

According to a principal embodiment of this invention there is provided highly polymeric linear polyesters having melting points above 150° C. as described above but with up to 90 mole percent (preferably no more than 50 mole percent) of the dimethylmalonic compound replaced with an aromatic dicarboxylic compound. Especially suitable compounds can be selected from the group consisting of 4,4'-sulfonyldibenzoic acid,
4,4'-diphenic acid,
terephthalic acid,
4,4'-benzophenone dicarboxylic acid,
1,2-di(p-carboxyphenyl) ethane,
1,2-di(p-carboxyphenoxy) ethane, and the lower alkyl esters of these acids. It is not generally desirable to include any of the aliphatic straight chain acids in these polymers if it is desired to produce a higher melting product. The glycol employed can be either a gem-dialkyl glycol, a lower straight chain glycol, an alicyclic glycol or an aromatic glycol.

Aromatic interpolyesters of especially advantageous utility and having certain valuable properties are described in copending application, Serial No. 529,076, filed on August 17, 1955 by J. R. Caldwell and J. W. Wellman, now U.S. Patent No. 2,921,052 issued on January 12, 1960 which relates to polyesters of sulfonyldibenzoic acid condensed with gem-dialkyl glycols and which may be modified with dimethylmalonic acid.

The aromatic interpolyesters just described are especially suited for the preparation of fibers and films although they can be employed for any of the usual purposes, as for example, those described above for the lower melting interpolyesters. The aromatic interpolyesters have excellent dye affinity without substantial impairment of the tensile strength, elongation, elastic recovery and other properties of the aromatic polyesters containing no dimethylmalonic acid, i.e. polyethyleneterephthalate. Moreover, these aromatic interpolyesters generally have greater resistance to hydrolysis. In addition, useful fibers and films can be prepared without the need for drafting and heat setting.

In practicing this invention with incompletely pure reactants it is especially advantageous to include in the polymerization system a stabilizer such as triphenyl phosphite, sodium carbonate, etc. when a gem-dialkyl glycol is being employed. The stabilizers which can be employed in polymerization systems are well known in the art and are described in numerous patents such as those presently classified in the U.S. Patent Office in pertinent subclasses of Class 260. Such stabilizers can be employed in amounts ranging from about 0.05 to about 5% based upon the weight of the materials being condensed. The employment of a stabilizer helps compensate to some extent for the employment of reactants which are not absolutely pure. Moreover, the stabilizers tend to prevent any tendency toward decomposition of the polymer as a result of external conditions which might promote deterioration after thay have been formed; for example, heat, sunlight, water, etc. It has been found that triphenyl phosphate is especially advantageous for this purpose although those skilled in the art of preparing synthetic resins will recognize that others can be similarly employed.

The polyesters of this invention can be extruded to form fibers or films. Such techniques are well known. The fibers can be twisted to form yarns which can be woven into fabrics which are quite useful in the manufacture of wearing apparel and for numerous other purposes. The films can be employed for the wrapping of various packaged products and for use as a dielectric in the manufacture of electrical condensers, electric motors, transformers, etc. Coatings of the polyesters of this invention can be extruded onto wire so as to form a superior insulating cover. Films of the polyesters of this invention can be employed as a base for supporting silver halide emulsions adapted for either black and white or color photography. Photographic film supported by the polyester of this invention was especially noteworthy because of the excellent heat stability of these polyesters. The degree distortion in motion picture film and consequent difficulties in movie projectors utilizing high temperature light sources is quite low.

One of the especially remarkable characteristics of the polyesters of this invention is the fact that the fibers and films which can be produced are of excellent physical quality even when they have not been subjected to the customary cold-drawing and heat-setting treatments. In many instances such treatments need not be employed and the products will be completely satisfactory. However, for photographic film and for other more stringent purposes it is advantageous to achieve the highest possible dimensional stability by drafting the polyester after it has been extruded in accordance with the usual cold-drawing techniques followed by heat treatment so as to achieve the optimum crystalline characteristics.

The invention can be further illustrated by the following examples in which the proportions of the ingredients are expressed in parts by weight.

*Example 1*

One hundred and ninety-four g. (1.0 mole) of dimethyl terephthalate, 61 g. (0.25 mole) of dibutyl dimethylmalonate, and 150 g. (2.4 moles) ethylene glycol were placed in a reaction vessel equipped with a stirrer, a distillation column, and an inlet for purified nitrogen. A solution of 0.1 g. magnesium titanium butoxide in 2 cc. of butyl alcohol was added as catalyst. The mixture was stirred at 190-200° C. in a nitrogen atmosphere. A mixture of butyl and methyl alcohol distilled during a period of two hours as the ester-interchange took place. The temperature was then raised to 260-270° C. and held for 30 minutes. A vacuum of 0.1 mm. was applied and the melt was stirred at 260-270° C. for three hours. The product had an inherent viscosity of 0.80 when measured in a solution of 60% phenol-40% tetrachlorethane.

The crystalline polymer melted at 230-240° C. and gave strong, elastic fibers that dyed well with cellulose acetate dyes.

It will be noted that this composition contains 20 mole percent dimethylmalonic acid. A copolyester of terephthalic acid and 20 mole percent glutaric acid (same number of carbon atoms as dimethylmalonic acid) is described by Edgar and Hill in J. Poly, Science 8, 1 (1952). The melting points of the copolyesters are compared in the table below:

| | M.P., ° C. |
|---|---|
| Polyethylene terephthalate | 264 |
| Polyethylene terephthalate+20 mole percent dimethylmalonic | 235 |
| Polyethylene terephthalate+20 mole percent glutaric | 205 |

*Example 2*

One hundred and sixty-five g. (0.85 mole) of dimethyl terephthalate, 24 g. (0.15 mole) of dimethyl dimethylmalonate, and 126 g. (2.0 moles) of ethylene glycol were placed in a reaction vessel as described in Example 1. A solution of 0.06 g. lithium aluminum ethylate in 5 cc. of ethyl alcohol was added as catalyst. The mixture was stirred at 190-200° C. in a stream of purified nitrogen and methyl alcohol was distilled through the column. After two hours, the temperature was raised to 270° C. and held for 30 minutes. A vacuum of 0.1 mm. was applied and stirring was continued for 8-10 minutes. The product was drained from the vessel and allowed to solidify. The solid prepolymer was then granulated to a particle size of 0.01-0.03 inch. The granulated prepolymer was heated in a vacuum of 0.05 mm. at 200° C. for one hour and at 220-230° C. for three hours. The product had an inherent viscosity of 0.86 when measured in a solution of 60 phenol-40 tetrachlorethane.

The polyester melted at 245-250° C. and gave strong elastic fibers that dyed well with cellulose acetate dyes.

Polyethylene terephthalate containing 15 mole percent of glutaric or adipic acid melts at 220–225° C.

This polyester is also valuable as a photographic film base, a molding plastic, and an electrical insulator.

*Example 3*

Using the procedure described in Example 1, a copolyester was made from one mole dimethyl dimethylmalonate, one mole dimethyl terephthalate, and excess ethylene glycol. The product was soluble in tetrachlorethane and films were obtained by casting the solution on glass plates. Films were also obtained by extruding the melted polymer. The films are useful as protective wrappings and for electrical insulation purposes. The polymer is also valuable as an insulator for electric wire.

*Example 4*

A polyester was made having the composition 0.80 mole 1,2-di(p-carboxyphenyl) ethane+0.20 mole dimethylmalonic acid+1.0 mole ethylene glycol. It melted at 190–200° C. and gave strong, elastic fibers that dyed well with cellulose acetate dyes. The polymer is especially useful as a molding plastic and as a photographic film base.

*Example 5*

A polyester was made having the composition 0.6 mole 4,4'-diphenic acid+0.4 mole dimethylmalonic acid+1.0 mole ethylene glycol. It softened in the range of 170–190° C. and was useful as a molding plastic and for wire insulation.

*Example 6*

A polyester was made having the composition 0.70 mole 1,2-di(p-carboxyphenoxy) ethane+0.30 mole dimethylmalonic acid+1.0 mole ethylene glycol. It softened at 160–180° C. and was useful as a molding plastic, protective wrapping sheet, and electrical insulator.

*Example 7*

A polyester was made having the composition 0.75 mole 4,4'-benzophenone dicarboxylic acid+0.25 mole dimethylmalonic acid+1.0 mole hexamethylene glycol. It was useful as a molding plastic and electrical insulator.

*Example 8*

Similar interpolyesters to those described in Examples 4, 5, 6 and 7 were prepared using 2,2-dimethyl-1,3-propanediol in lieu of the straight chain glycol. In each instance the interpolyester produced softened at about 150° C. or higher and was of improved value in applications where resistance to high temperature effects is desirable, e.g. fibers for fabrics, photographic film for motion picture projection, etc.

Other variations within the scope of this invention are readily apparent from the above description. Various mixtures of any two or more of the dicarboxylic compounds or of the glycolic compounds can be employed in preparing useful interpolyesters of dimethylmalonic acid using the procedures described herein.

I claim:

1. A highly polymeric linear polyester of a dicarboxylic acid and a glycol, said polyester having an intrinsic viscosity measured in a phenol and tetrachloroethane solution of at least 0.4 and having a melting point above 150° C., wherein from 10 to 50 mole percent of said acid is dimethylmalonic acid with the remainder of said acid being terephthalic acid and said glycol being
   (a) polymethylene glycols containing from 2 to 10 carbon atoms
   (b) 1,4-cyclohexanedimethanol and
   (c) gem-dialkyl glycols having the formula

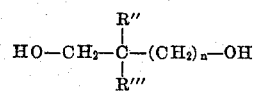

where R'' and R''' each represents an alkyl radical containing from 1 to 2 carbon atoms and $x$ represents an integer of from 1 to 3.

2. A polyester as defined by claim 1 wherein said glycol is 2,2-dimethyl-1,3-propanediol.
3. A polyester as defined by claim 1 wherein said glycol is ethylene glycol.
4. A fiber of the polyester defined by claim 1.
5. A film of the polyester defined by claim 1.

References Cited in the file of this patent

UNITED STATES PATENTS

| | | |
|---|---|---|
| 2,483,726 | Floyd | Oct. 4, 1949 |
| 2,643,989 | Auspos | June 30, 1953 |
| 2,720,503 | Wellman | Oct. 11, 1955 |
| 2,744,092 | Caldwell | May 1, 1956 |

FOREIGN PATENTS

| | | |
|---|---|---|
| 588,833 | Great Britain | June 4, 1947 |